United States Patent [19]

Nelson

[11] Patent Number: 4,630,497
[45] Date of Patent: Dec. 23, 1986

[54] TAPERED WORM

[75] Inventor: Bertel S. Nelson, Naperville, Ill.

[73] Assignee: Wedgtrac Corporation, Yorkville, Ill.

[21] Appl. No.: 668,196

[22] Filed: Nov. 5, 1984

[51] Int. Cl.$^4$ .......................... F16H 1/16; F16H 1/20; F16H 55/17; F16H 55/22
[52] U.S. Cl. ......................................... 74/425; 74/458
[58] Field of Search ................................ 74/425, 458

[56] References Cited

U.S. PATENT DOCUMENTS

| 1,759,968 | 5/1930 | Trbojevich | 74/458 |
| 2,868,031 | 1/1959 | Schumb | 74/425 |
| 3,106,103 | 10/1963 | Smith | 74/458 |
| 3,386,305 | 6/1968 | Wildhaber | 74/425 |
| 3,398,590 | 8/1968 | Campbell et al. | 74/425 |
| 3,435,506 | 4/1969 | Schmidt | 74/458 |
| 3,608,394 | 9/1971 | Ishikawa | 74/458 |
| 4,220,053 | 9/1980 | Barlow et al. | 74/425 |

Primary Examiner—Kenneth J. Dorner
Assistant Examiner—Michael D. Bednarek
Attorney, Agent, or Firm—Trexler, Bushnell & Wolters, Ltd.

[57] ABSTRACT

A worm and meshing worm gear are provided. The worm has a central cylindrical portion, and tapered portions at either end thereof. The angle of taper of the two tapered portions is the same, but in different directions. The angle of taper is substantially equal to 360 degrees divided by the number of teeth in the worm gear. Contact between the worm and gear occurs over three times the number of teeth in which contact is obtained with a conventional cylindrical worm. The worm is capable of being formed by thread rolling.

5 Claims, 3 Drawing Figures

TAPERED WORM

BACKGROUND OF THE INVENTION

Worm gearing is well known and is used in installations where a driving shaft and a driven shaft must be at right angles to one another. The worm is of cylindrical outline in simplest form and has one or more thread turns or spiral teeth thereon. A meshing worm gear has a plurality of appropriately twisted teeth having tooth flank surfaces, generally of an involute curved shape, which are conjugate to the worm.

The instantaneous contact between a worm and a worm gear is at a rather limited area where the worm is tangent to the gear. The area of contact is quite limited, generally being aong a full line on one tooth and a very short line on an adjacent tooth. Consequently, only a limited amount of power can be transmitted between a worm and worm gear.

Efforts have been made to provide greater contact between a worm and a worm gear and thereby to permit greater transmission of power by shaping the worm somewhat in the nature of an hourglass. Manufacture of such worms is quite a complicated process, requiring precise control of the relative positions of the worm blank and of a cutting tool as the worm blank is turned. It is not possible to form hourglass worms by a thread rolling process as is possible with straight worms.

OBJECTS AND SUMMARY OF THE PRESENT INVENTION

It is an object of the present invention to provide an improved worm and gear having many of the advantages of an hourglass worm and gear, but capable of being produced by a thread rolling process.

More specifically, it is an object of the present invention to provide a worm having a central cylindrical section and two or more end portions each having a straight taper.

In attaining the foregoing and other objects and advantages, I provide a worm having a central cylindrical section, i.e. a straight section. At either end thereof and symmetrically disposed relative thereto, I provide tapered sections which allows the worm substantially to envelop the gear and to provide tooth contact at several locations spaced axially of the worm, rather than at one or two sections as on a conventional straight worm. The angle of taper is equal to 360 degrees divided by the number of teeth in the gear, or an integer multiple of such number. For example, for 26 teeth, the angle would be 360 degrees divided by 26 equals 13.846 degrees. It could also be 27.692, etc. The lead of the thread in the cone areas is that of the central lead times the cosine of the taper angle.

THE DRAWINGS

DETAILED DISCLOSURE OF THE ILLUSTRATED EMBODIMENT

Figure 1:
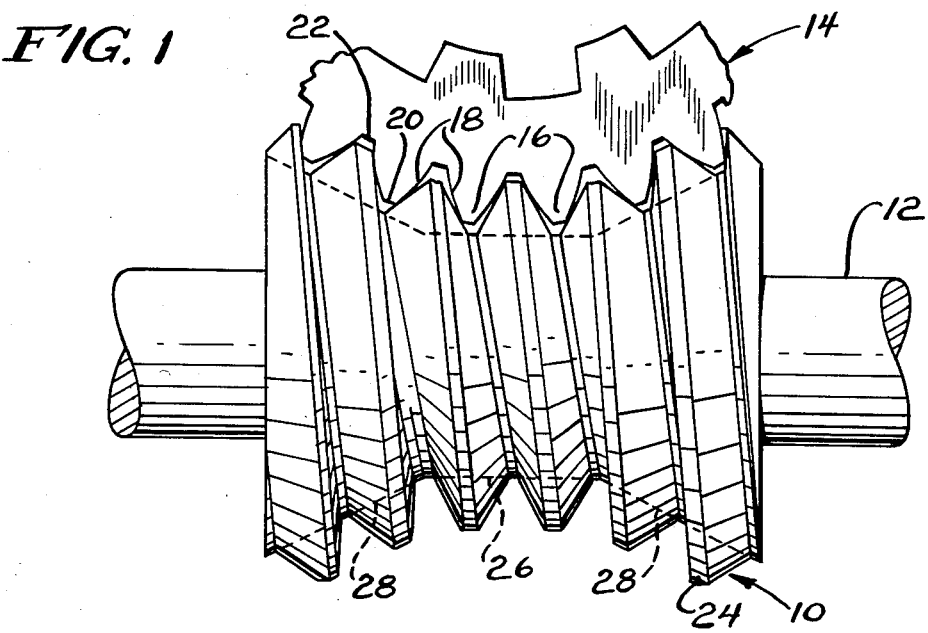
FIG. 1 is an elevational view of a worm and gear constructed in accordance with the principles of the present invention.

Turning now in greater detail to the figures of the drawing, there will be seen a worm 10 fixed on a shaft 12 and meshing with a worm gear or worm wheel 14. The worm wheel is of substantially conventional design having a plurality of teeth 16 having curved flanks or working surfaces 18, substantially flat crests 20, and substantially flat valleys 22. The teeth are preferably slightly twisted to accommodate to the lead of the thread of the worm 10, as is known in connection with worm and wheel gearing.

The worm 10 is provided with a single lead or thread 24 extending from one end to the other thereof. The worm comprises three sections, each of which is straight. The first or center section 26 as indicated by the broken line is cylindrical and the thread through this area is conventional. At either end of the center cylindrical section 26 are tapered sections indicated by the broken lines 28. The taper angles are equal, but in opposite directions. This provides a frustoconical section at either end of the worm. The thread 24 is inclined to conform to the taper of the frustoconical sections 28. The angle of taper as represented by the broken lines 28 is equal to 360 degrees divided by the number of teeth in the gear, or an integer multiple thereof. In the drawings the worm wheel or worm gear 14 has 27 teeth, so the angle of taper is 13.333 degrees. It could also be 26.667, etc. The thread lead in the conical portions of the worm is the same as the lead in the cylindrical central portions times the cosine of the taper angle.

If the taper angle is maintained approximately correct, then the thread is continuous from the central cylindrical section to the tapered portions. There is a discontinuity in the thread form at the intersection between the cylindrical and frustoconical tapered areas. This occurs at a plane passing through the gear axis at an angle of one-half the taper angle from the plane through the gear axis and perpendicular to the worm axis. This discontinuity of form does not interfere with the tooth mesh action because any portion of the worm thread lying inside of this plane will have the form of the cylindrical section, and any portion outside of this plane will have the form of the tapered cone section. Also, by suitable design, this discontinuity occurs at a portion of the worm which is inactive. That is, there is no contact with the gear tooth in this area.

Figure 2:
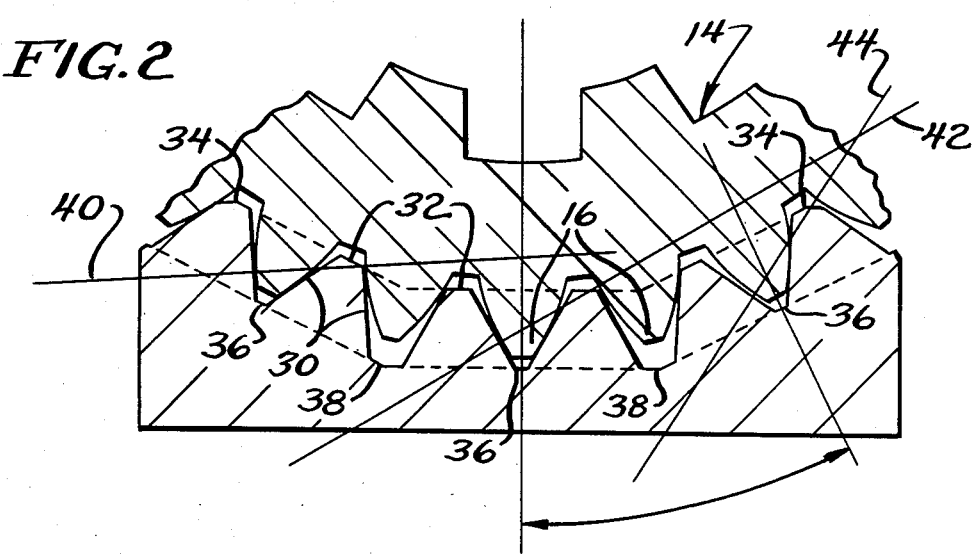
FIG. 2 is a fragmentary sectional view taken along the axis of the worm and showing contact of the worm with the gear in one position of operation.
Figure 3:
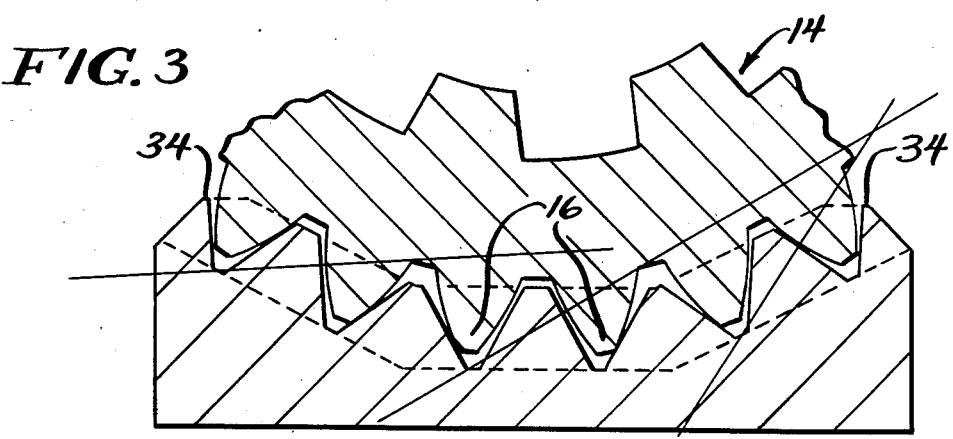
FIG. 3 is a view similar to FIG. 2 with a worm rotated 180 degrees.

Turning to the sectional views of FIGS. 2 and 3, the worm being rotated 180 degrees from FIG. 2 to FIG. 3, it will be seen that the flanks or faces of the worm thread 24 are flat at 30. The crest 32 is mainly flat, but is somewhat distorted at the outer positions 34, as may be seen. Likewise, the root or valley 36 is flat both in the cylindrical portion of the worm, and in the tapered frustoconical portions, but is a combination of two flat portions at the juncture 38. The thread bears the same inclination to the tapered portion as to the cylindrical portion.

The worm, as has been noted previously is of a single lead, and has a right hand thread and rotates in a clockwise direction as viewed from the right side of the drawing. There is a low pressure angle line of action 40 between the left frustoconical worm portion 28 and gear teeth 16 meshing therewith. There is also a central line of action 42 between the worm thread in the central, cylindrical portion of the worm, and there is also a high pressure angle line of action 44 between the thread in the right tapered or frustoconical portion of the worm and corresponding gear teeth.

The angle of the taper cone can vary somewhat from the theoretical angle heretofore set forth, i.e. 360 degrees divided by the number of gear teeth, and still obtain the desired advantage which is that three times the number of teeth will be in contact as the number of contacting teeth in a conventional cylindrical worm. Consequently, the load carrying capacity is greatly increased and is generally equivalent to the so called hourglass or double enveloping type of worm and gear. It has the distinct advantage over the hourglass type in that the worm thread can be thread rolled, which is a high production, low cost manufacturing process. I have been advised that at the present state of the art the hourglass worm cannot be thread rolled, and is extremely expensive to produce.

Accordingly, a worm constructed in accordance with the present invention has significantly increased load transferring capacity as compared with a conventional cylindrical worm, and it can be manufactured at substantially the same cost as the cylindrical worm, substantially less than the cost of manufacturing an hourglass worm.

The specific example of the invention as heretofore shown and described is for illustrative purposes only. Specifically, it is noted that two taper sections (at say 13.846 degrees and 27.692 degrees for the 26 tooth gear example) could be used at each side of the cylindrical section. If the gear had a relatively large number of teeth such as 60 or 80, then even three or four taper sections might be used at each side of the cylindrical section. Various other changes in structure will no doubt occur to those skilled in the art, and will be understood as forming a part of the present invention insofar as they fall within the spirit and scope of the appended claims.

The invention is claimed as follows:

1. A worm and a worm gear meshing therewith, said worm gear having a predetermined number of teeth, said worm comprising a substantially cylindrical portion, and at least one tapered frustoconical portion at an end of said cylindrical portion, the taper angle of said tapered portion being substantially equal to n(360 degrees divided by said predetermined number of teeth of said gear), and a thread extending over said substantially cylindrical portion and said tapered portion, where n is an integer of one or more, the thread on both said cylindrical portion and on said tapered portion being simultaneously in driving engagement with the teeth of said gear.

2. A worm as set forth in claim 1, wherein the thread bears the same inclination to said tapered portion as to said substantially cylindrical portion.

3. A worm as set forth in claim 1, wherein there are two threaded tapered frustoconical portions, one at either end of said cylindrical portion, and the thread on the two tapered portions and on the cylindrical portion being simultaneously in driving engagement with the teeth of said gear.

4. A worm as set forth in claim 2, wherein there are two threaded tapered frustoconical portions, one at either end of said cylindrical portion, and the thread on the two tapered portions and on the cylindrical portion being simultaneously in driving engagement with the teeth of said gear.

5. A worm and a worm gear meshing therewith, said worm gear having a plurality of teeth, said worm comprising a substantially cylindrical portion, and a pair of tapered frustoconical portions at each end of said cylindrical portion, and a thread extending over said substantially cylindrical portion and both of said tapered portions, the thread on both said cylindrical portions and on said tapered portions being simultaneously in driving engagement with the teeth of said gear.

* * * * *